Patented June 23, 1936

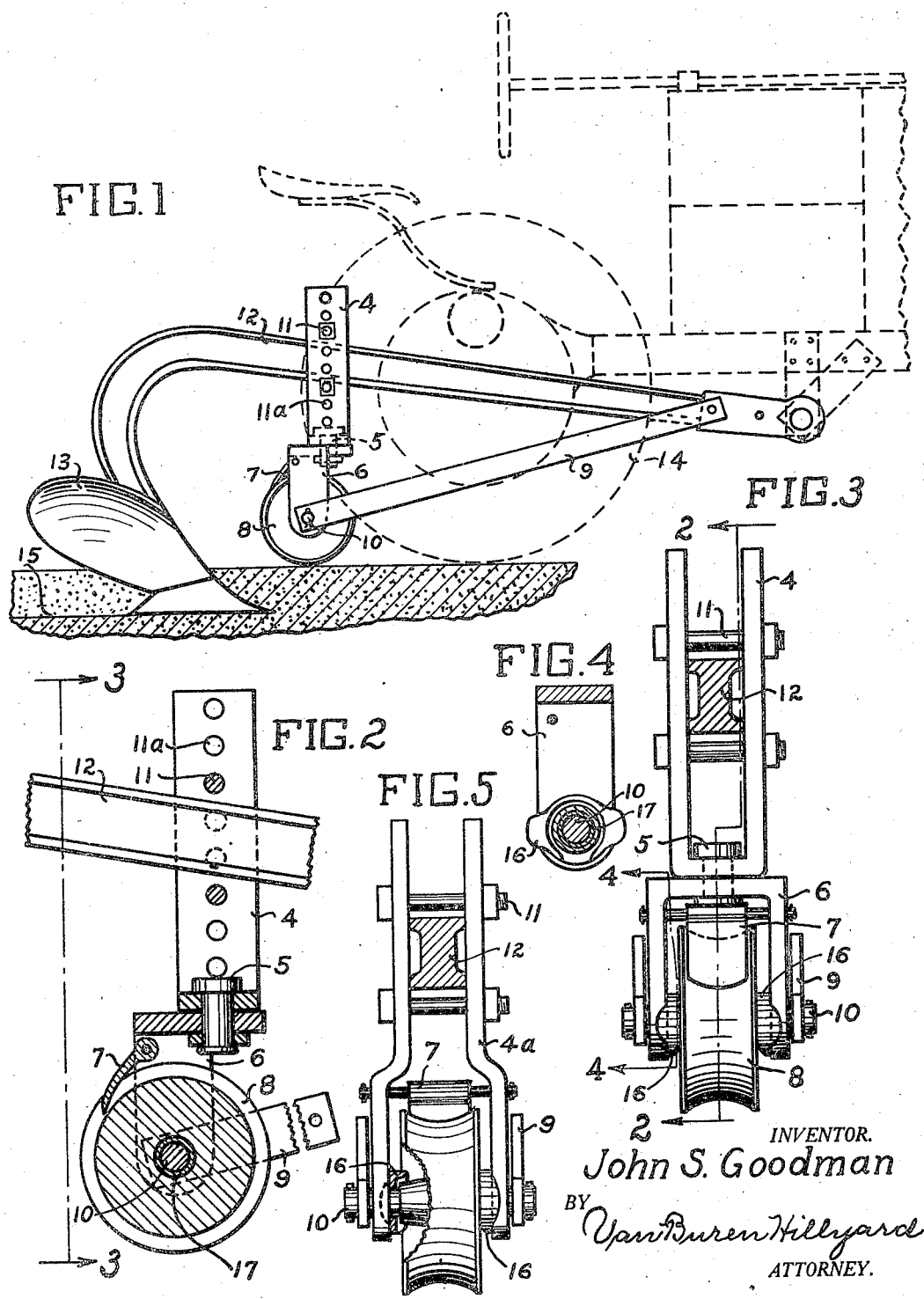

2,045,461

UNITED STATES PATENT OFFICE 2,045,461

PLOW DEPTH GAUGE

John S. Goodman, Wichita Falls, Tex., assignor of one-half to George Hoyet Hamill, Grandfield, Okla.

Application June 17, 1935, Serial No. 27,114

1 Claim. (Cl. 97—189)

The invention relates to an attachment for plows, cultivators and analogous implements, being designed to regulate the depth of cultivation in loose and soft soil.

The primary object of the invention is the provision of a depth gauge which will not sink in loose or soft soil and which obviates side draft because of the depressed formation of the tread surface.

A further purpose of the invention is the provision of a depth gauge adjustable vertically and capable of being mounted for free angular or pivotal movement, or set to maintain a given position according to the nature of the plow, cultivator or implement with which the gauge is associated.

The invention furthermore aims to mount the gauge in a manner to exclude sand and like matter from the bearings to prevent rapid wear and to obviate interference with the free rotation of the runner.

While the drawing illustrates a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which:

Figure 1 is a side view of an embodiment of the invention applied to a plow, the dotted lines indicating a tractor to which the implement is hitched.

Figure 2 is an enlarged sectional detail view on the line 2—2 of Figure 3.

Figure 3 is a rear view showing the beam in section on the line 3—3 of Figure 2.

Figure 4 is a sectional detail on the line 4—4 of Figure 3.

Figure 5 is a front view of a modification.

Corresponding and like parts are referred to in the following description and designated in the several views of the drawing by like reference characters.

The numeral 12 designates the beam of a conventional plow, cultivator or like implement, and 13 the plow or shovel. The attachment embodies a standard and runner, the standard in the preferred form being U-shaped, as designated at 4. The runner consists of a wheel 8 having a broad tread which is circumferentially depressed to a half round contour. The broad and depressed tread of the wheel prevents sinking in loose and soft soil and obviates side draft and slipping. The wheel 8 is mounted in a U frame 6 which may be pivoted or rigid. A pivot 5 connects the closed end of the frame 6 with the lower closed end of the standard 4. The axle 10 is supported in the side members of the frame and projects at its ends to receive braces 9 when it is required to hold the frame 6 rigid and prevent pivotal or angular movement. A bearing 17 of wood or other preferred material is interposed between the axle 10 and wheel 8. Guards 16 at the inner sides of the frame members 6 extend over and in front and rear of the hubs of the wheel 8 to shed sand and foreign matter tending to collect between the wheel 8 and its bearings. These guards 16 are open at the bottom to provide a ready escape for any sand or other matter that may find its way into the bearings. A scraper blade 7 is pivoted between the side members of the frame 6 and its edge conforms to the transverse contour of the depressed tread of the wheel 8 to remove earth or other matter adhering thereto.

In some types of implements and nature of soil it is preferable to have the frame 6 free to permit free angular or pivotal movement of the depth wheel. However, when it is desired to mount the wheel 8 rigidly, braces 9 engage the projecting ends of the axle 10 and are fastened to the sides of the beam 12.

In the form shown in Figure 5, the frame 6 is dispensed with, the members 4a comprising the standard being extended and outwardly curved to extend along the sides of the wheel 8 therebetween and receive the axle 10. In either form, the standard is vertically adjustable and its members have corresponding openings 11a to receive bolts 11 which clamp the standard to the sides of the beam 12 in the required adjusted position.

The broad tread and depressed surface of the wheel 8 prevent sinking and side slipping of the wheel in loose and soft soil and assure a firm support on all kinds of surfaces and soil.

Having thus described the invention, what I claim is:

A depth gauge for plows and like implements comprising a standard, a frame pivoted to the standard, an axle mounted in the frame and having its ends projecting to receive braces, a broad faced wheel mounted on the axle and having its tread surface depressed, and provided at its sides with hubs, and guards at the sides of the frame extending across and in front and rear of the hubs of the wheel and open at the bottom.

JOHN S. GOODMAN.